United States Patent [19]
Smith

[11] 3,891,247
[45] June 24, 1975

[54] PLASTIC ONE-PIECE SADDLE FOR PLASTIC PIPE

[76] Inventor: Lynn Elwyn Smith, Box A-E, San Luis Obispo, Calif. 93401

[22] Filed: Apr. 8, 1974

[21] Appl. No.: 458,827

[52] U.S. Cl. .............. 285/110; 285/197; 285/423
[51] Int. Cl. ............................................. F16l 5/00
[58] Field of Search ................. 285/197, 110, 423; 403/234, 237

[56] References Cited
UNITED STATES PATENTS

| | | | |
|---|---|---|---|
| 1,908,821 | 5/1933 | Cornell, Jr. | 285/197 |
| 2,942,902 | 6/1960 | Rowland | 285/197 |
| 3,432,188 | 3/1969 | Turner | 285/197 |
| 3,649,055 | 3/1972 | Nilsen | 285/423 X |

*Primary Examiner*—Andrew V. Kundrat
*Attorney, Agent, or Firm*—Owen, Wickersham & Erickson

[57] ABSTRACT

A plastic saddle for plastic pipe comprises a central boss for a branch pipe and depending side bands having a molded in diameter somewhat smaller than the outside diameter of the plastic pipe. The lower ends of the side bands have molded in spikes for gripping into the surface of the plastic pipe. The part of the saddle beneath the central boss has a flexible annular shaped gasket member molded in and formed with a feather edge for engagement with the outer surface of the plastic pipe around the periphery of the opening in the main pipe. The central boss has slots and a relieved space behind the gasket which permit fluid pressure to stretch and to seal the feather edge gasket by causing the flexible gasket to back flow to a certain extent when acted on by the fluid pressure.

14 Claims, 5 Drawing Figures

PLASTIC ONE-PIECE SADDLE FOR PLASTIC PIPE

BACKGROUND OF THE INVENTION

This invention relates to a plastic saddle for plastic pipe.

A saddle is used when a branch pipe is attached to a main pipe. The saddle is attached to the outside of the main pipe to be tapped and has a boss with a central opening for the branch pipe. A hole is drilled through the wall of the main pipe directly beneath the opening in the boss. After the hole is drilled, the branch pipe is attached to the central boss of the saddle. To prevent leaking between the main and branch pipes it is, of course, necessary that a fluid tight seal be effected around the area of the main pipe where the hole is drilled.

In the past, strap bolts and nuts were often used for installing pipe saddles. Tools were needed for such installations and the necessary sealing action around the drilled hole in the main pipe was dependent in large measure upon the strength and the pressure exerted by the bolts and nuts.

Such prior art constructions also presented a danger of placing too much clamping pressure on the main pipe. This can be a particular problem in making effective installations of pipe saddles on relatively low strength and flexible plastic pipe such as the polyvinyl cloride pipe now coming into large scale use.

SUMMARY OF THE INVENTION

It is a primary object of the present invention to construct a plastic one-piece saddle for plastic pipe.

Related objects are to construct a plastic one-piece saddle in a way such that it is self-holding and self-sealing and overcomes the problems of the prior art.

The plastic saddle of the present invention has a central boss for a branch pipe with at least one side band depending from each side of the central boss. Each side band has a molded in diameter somewhat smaller than the outside diameter of the plastic main pipe.

The lower ends of each side band have molded in spikes which grip into the outside surface of the plastic pipe. The projecting ends of the spikes are inclined upwardly at an angle to increase the gripping force when the pressure within the pipe expands the pipe.

The saddle also has a feather edge gasket molded in the inside surface of the saddle just beneath the central boss. There is a relieved space behind the outer periphery of the gasket, and slots are formed in the central boss to permit fluid pressure to contact the top of the gasket. This causes the gasket to back flow to a limited extent within the relieved space provided for that purpose to give a better seal.

The plastic one-piece saddle of the present invention is therefore a self-holding, self-sealing saddle that is quickly and easily installed without any tools, and it is effective to provide positive sealing using the pressure of the fluid within the main pipe.

Plastic saddle apparatus and methods which incorporate the structure and techniques described above and which are effective to function as described above constitute specific objects of this invention.

Other objects, advantages and features of my invention will become apparent from the following detailed description of preferred embodiments taken with the accompanying drawings.

DESCRIPTION OF THE PREFERRED EMBODIMENTS

Figure 1:
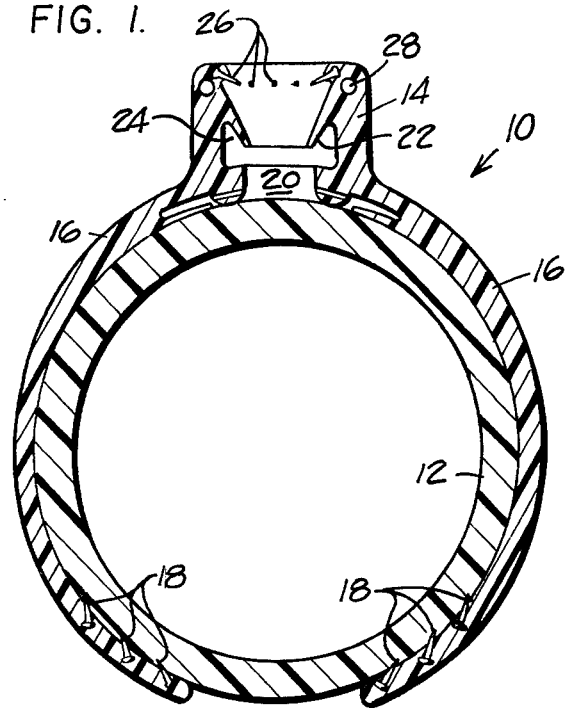
FIG. 1 is an end elevation view in section showing a plastic one-piece saddle constructed in accordance with one embodiment of the present invention and installed on a plastic main pipe.

A plastic saddle constructed in accordance with one embodiment of the present invention is indicated generally by the reference numeral 10 in FIG. 1.

The saddle 10 is shown installed on a plastic main pipe 12 prior to drilling a hole into the main pipe 12 for the outlet to a branch pipe (not illustrated) which fits within a central boss 14 of the saddle 10.

A side band 16 extends downwardly from each side of the central boss 14. The molded in diameter of each side band 16 is somewhat smaller than the outside diameter of the pipe 12 so that the side bands will spring against the pipe. A metal spring (not illustrated) may be molded in each side band to give increased tension.

The lower end of each side band 16 has a plurality of spikes 18. The spikes are molded into the side bands and have sharp pointed ends which project just far enough to grip into the outer surface of the pipe 12. The spikes are mounted at an upward angle so that as the plastic pipe expands slightly under water pressure the inclinations of the spikes cause the side bands to grip the pipe more tightly. In a specific form of the present invention the spikes 18 are carpet tacks.

Figure 4:
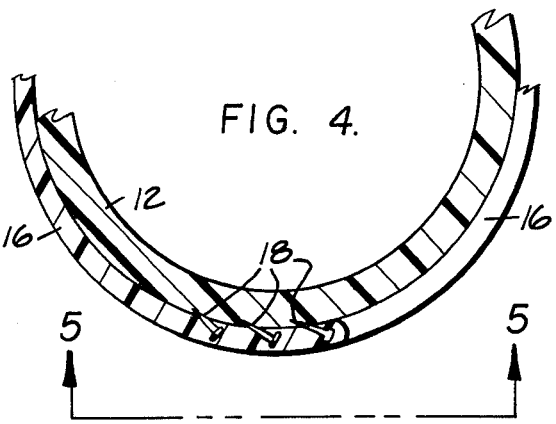
FIG. 4 is a fragmentary view of the lower end of a pipe saddle constructed in accordance with another embodiment of the present invention.
Figure 5:
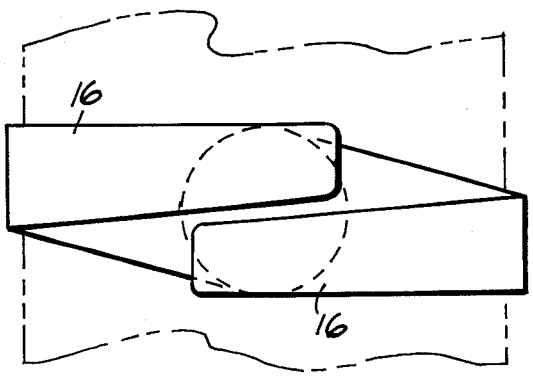
FIG. 5 is a bottom plan view taken along the line and in the direction indicated by the arrows 5—5 in FIG. 4 and shows the overlapping side bands of this embodiment.

In the embodiment of the invention shown in FIG. 1, the ends of the side bands 16 are spaced apart to facilitate slipping the saddle over the pipe 12. However, these side bands may be made to overlap, as illustrated in FIGS. 4 and 5. The overlapping side bands can also be made to innerlock (not illustrated). In this event, the spikes 18 of one side band engage the outer surface of the pipe 12 (in the manner illustrated in FIGS. 1 and 5) while the spikes 18 of the other side band engage the outer surface of the first side band.

While only one side band has been illustrated on each side of the central boss 14, a plurality of side bands on each side of the central boss can be used in the present invention.

As noted generally above, the boss 14 has an opening 20 for a branch pipe (not illustrated). After the saddle 10 has been installed as illustrated in FIG. 1, a hole is drilled or otherwise formed through the side wall of the main pipe 12 in line with the opening 20. The end of the branch pipe is then inserted within the central boss.

A conical shaped, flexible sealing member 22 engages the outer periphery of the branch pipe. The space 24 behind this member 22 permits sufficient flexing of the sealing member 22 to insure a positive seal against the branch pipe.

Gripping spikes 26 are molded in the upper end of the boss 14 and are inclined downwardly at a slight angle as illustrated. These spikes 26 grip the outer periphery of the branch pipe in much the same way that the spikes 18 grip into the outer surface of the main pipe 12.

A metal spring 28 provides increased tension for insuring a tight grip of the upper end of the boss 14 onto the branch pipe.

The periphery of the opening in the main pipe (below the central opening 20 of the boss) must be sealed, and the present invention provides a flexible annular gasket which makes use of the fluid pressure within the pipe 12 to insure a positive seal between the pipe saddle and the pipe 12.

Figure 2:
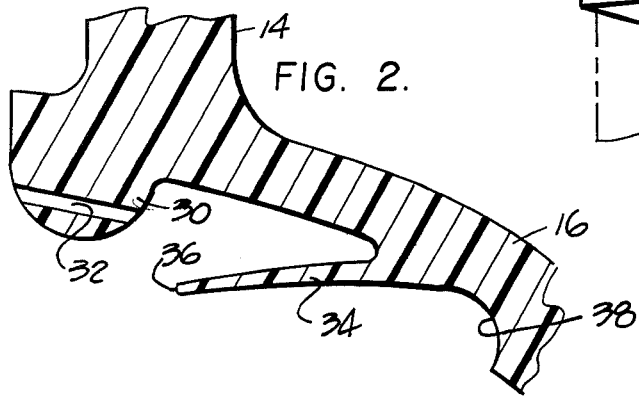
FIG. 2 is a fragmentary enlarged view showing details of the feather edge sealing gasket of the saddle shown in FIG. 1 and illustrates the disposition of the gasket with respect to the pipe saddle before installation.
Figure 3:
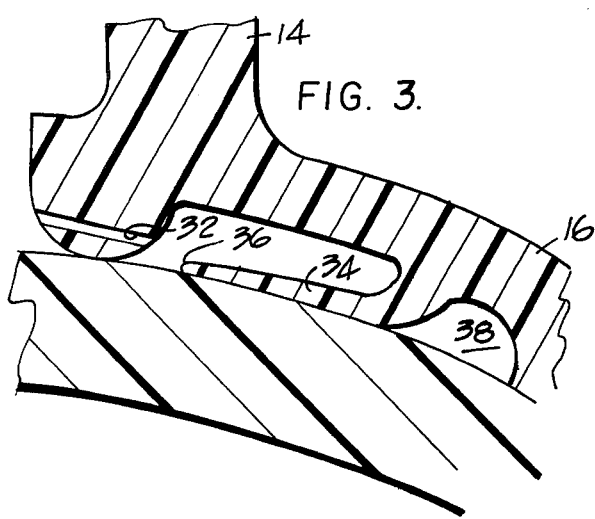
FIG. 3 is a view like FIG. 2 but showing the deflection produced by fluid pressure acting on the feather edge gasket after the pipe saddle has been installed.

As best illustrated in FIGS. 2 and 3, the central boss 14 includes a downwardly projecting ridge 30 which encircles the opening in the main pipe 12. A plurality of radial extending slots 32 are formed in this ridge 30.

A relatively thin section, annular gasket member 34 also extends circumferentially around the outer periphery of the opening drilled in the main pipe 12. The inner edge 36 of the gasket is a feather edge, and a relieved space 38 is formed behind the juncture of the outer end of the gasket 34 with the pipe saddle.

Thus, as best illustrated in FIG. 3, the pressure of the fluid flowing through the slots 32 acts on the space above the gasket 34 to cause the gasket to back flow to a limited extent into the space 38. This in turn flexes and stretches the feather edge 36 into positive fluid tight sealing engagement with the outer periphery of the pipe 12.

The plastic one-piece saddle of the present invention is therefore a self-holding, self-sealing saddle which needs no tools for installation. It is quickly and easily installed. Once installed, it provides an effective and fluid tight connection between the main pipe and the branch pipe.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A plastic saddle for plastic pipe and comprising, a central boss for a branch pipe, at least one side band depending from each side of the central boss, each side band having a molded in diameter somewhat smaller than the outside diameter of the plastic pipe, and holding means including sharp points projecting from the inside surface of each band near the lower end of the band and effective to grip into the outer surface of the plastic pipe.

2. The invention defined in claim 1 including a plurality of bands on each side of the central boss.

3. The invention defined in claim 1 wherein the central boss includes an upper end portion having inwardly projecting gripper means including sharp points for gripping into the outer surface of a branch plastic pipe which fits within the central boss.

4. A plastic saddle for plastic pipe and comprising, a central boss for a branch pipe, at least one side band depending from each side of the central boss, each side band having a molded in diameter somewhat smaller than the outside diameter of the plastic pipe, and holding means projecting from the inside surface of each band near the lower end of the band and effective to grip into the outer surface of the plastic pipe, and wherein the holding means include molded in spikes having outer points directed generally upward toward the central boss.

5. A plastic saddle for plastic pipe and comprising, a central boss for a branch pipe, at least one side band depending from each side of the central boss, each side band having a molded in diameter somewhat smaller than the outside diameter of the plastic pipe, and holding means projecting from the inside surface of each band near the lower end of the band and effective to grip into the outer surface of the plastic pipe, and wherein the bands are long enough to overlap at the bottom of the plastic pipe.

6. A plastic saddle for plastic pipe and comprising, a central boss for a branch pipe, at least one side band depending from each side of the central boss and being long enough to overlap at the bottom of the plastic pipe, each side band having a molded in diameter somewhat smaller than the outside diameter of the plastic pipe, and holding means projecting from the inside surface of each band near the lower end of the band and effective to grip into the outer surface of the plastic pipe, and wherein the bands interlock in at least part of the overlap.

7. A plastic saddle for plastic pipe and comprising, a central boss for a branch pipe, at least one side band depending from each side of the central boss, each side band having a molded in diameter somewhat smaller than the outside of the plastic pipe, and holding means projecting from the inside surface of each band near the lower end of the band and effective to grip into the outer surface of the plastic pipe, and including gasket means integrally molded in the saddle on the inner surface of the saddle and concentric with the central boss, and wherein the gasket means include a thin section, annular member extending radially inward with respect to the axis of the central boss from the inner surface of the saddle for flexibly engaging the outer surface of the pipe in the area around the part of the pipe to be drilled.

8. The invention defined in claim 7 wherein the radially inner edge of the flexible member is feathered to lie flat against the outer surface of the pipe.

9. A plastic saddle for plastic pipe and comprising, a central boss for a branch pipe, at least one side band depending from each side of the central boss, each side band having a molded in diameter somewhat smaller than the outside diameter of the plastic pipe, holding means projecting from the inside surface of each band near the lower end of the band and effective to grip into the outer surface of the plastic pipe, gasket means integrally molded in the saddle on the inner surface of the saddle and concentric with the central boss, the gasket means including a thin section, annular member extending radially inward for flexibly engaging the outer surface of the pipe in the area around the part of the pipe to be drilled, and wherein the radially inner edge of the flexible member is feathered to lie flat against the outer surface of the pipe, and wherein the central boss includes a downwardly extending rim for engaging the pipe around the periphery of the part to be drilled and wherein said rim is located radially inward with respect to the feather edge of the gasket member and including slots in the rim for the flow of fluid pressure to the space above the feather edge gasket member.

10. A plastic saddle for plastic pipe and comprising, a central boss for a branch pipe, at least one side band depending from each side of the central boss, each side band having a molded in diameter somewhat smaller than the outside diameter of the plastic pipe, and holding means projecting from the inside surface of each band near the lower end of the band and effective to grip into the outer surface of the plastic pipe, and including a molded in metal spring in the upper end part of the central boss for increasing the tension of the gripping action on the branch pipe.

11. A plastic saddle for plastic pipe and comprising a central boss for a branch pipe, at least one side band depending from each side of the central boss, and an annular shaped gasket member projecting radially inward with respect to the axis of the central boss and integrally from the inner surface of the saddle and concentric with the central boss and effective to flexibly engage the outer surface of the plastic pipe radially outwardly of the top edge of the periphery of the opening in the pipe.

12. The invention defined in claim 11 wherein the radially inner edge of the gasket member is a feather edge.

13. A plastic saddle for a plastic pipe and comprising a central boss for a branch pipe, at least one side band depending from each side of the central boss, and an annular shaped gasket member projecting radially inward from the inner surface of the saddle and concentric with the central boss and effective to flexibly engage the outer surface of the plastic pipe around the periphery of the opening in the pipe, and wherein the radially inner edge of the gasket member is a feather edge, and wherein the central boss includes a downwardly extending annular ridge which engages the outer surface of the plastic pipe around the periphery of the opening in the main pipe and radially inwardly of the inner edge of the gasket member and including slots in the ridge for permitting fluid flow radially outwardly and above the annular gasket member.

14. The invention defined in claim 13 wherein the saddle includes a relieved space behind the gasket member to permit the gasket member to flex into positive sealing contact by limited back flow into the relieved space.

* * * * *